No. 651,597. Patented June 12, 1900.
R. EYRE.
ELECTRIC WELDING.
(Application filed Aug. 11, 1898.)
(No Model.)

WITNESSES:
Myrtle E. Sharpe.
Robert M. Evans

INVENTOR
Richard Eyre

THE NORRIS PETERS CO., PHOTO-LITHO., WASHINGTON, D. C.

UNITED STATES PATENT OFFICE.

RICHARD EYRE, OF JOHNSTOWN, PENNSYLVANIA.

ELECTRIC WELDING.

SPECIFICATION forming part of Letters Patent No. 651,597, dated June 12, 1900.

Application filed August 11, 1898. Serial No. 688,408. (No model.)

*To all whom it may concern:*

Be it known that I, RICHARD EYRE, of Johnstown, in the county of Cambria and State of Pennsylvania, have invented a new and useful Improvement in Electric Welding, of which the following is a full, clear, and exact description, reference being had to the accompanying drawings, which form a part of this specification.

My invention relates to electric welding, and has for its object the provision of a novel process for electric welding whereby welds may be made at temperatures very much lower than any hitherto used to make a successful weld.

In the ordinary method of electric welding the two pieces are brought in contact with each other, the heating-current is passed through them until the temperature has rendered the metal extremely plastic, and then the two surfaces to be welded are pushed toward each other, so that the two plastic surfaces will directly unite. My improved process, while it may be used with precisely the same apparatus as that already known in the art, differs radically from the old process as just set forth in that it is the object of my process to avoid making the union between the two articles at the two originally-contacting surfaces. I have found that the necessity for the high temperature ordinarily used arises from the difficulty in uniting surfaces which have been exposed to the atmosphere. Presumably this is due to a thin imperceptible film of oxid or some other extraneous material on the surface of the metal. If, therefore, the welding process is so conducted that the exposed surfaces are entirely pushed outside the regular cross-section of the bar and unexposed portions are brought into contact with each other without being exposed to the air, a true weld may be made at temperatures far below any hitherto thought possible. For example, I have welded Bessemer steel by my improved process when the maximum temperature for any portion of the bar was not more than a dull-red heat and when the temperature of those portions of the bars which formed the actual union was insufficient to cause a perceptible glow.

My invention therefore consists, broadly, in a process of electric welding in which the original exposed surfaces of the bar are only heated for the purpose of making the bar ductile, the real union between the bars being effected entirely by metal which formed no part of the exposed surfaces.

My invention also consists in the specific steps of the process, which I will set forth, by which I attain my general object.

Figure 1:
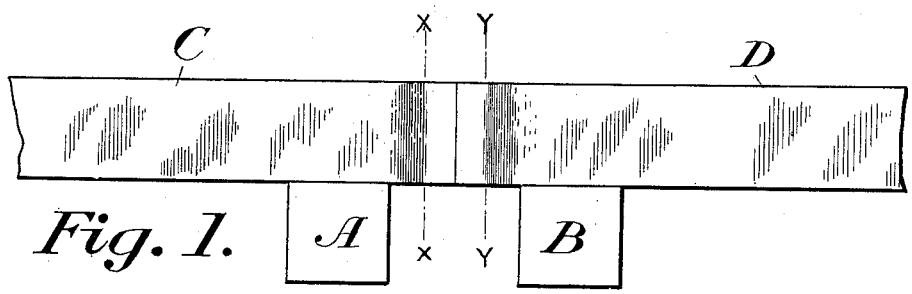
Figure 2:
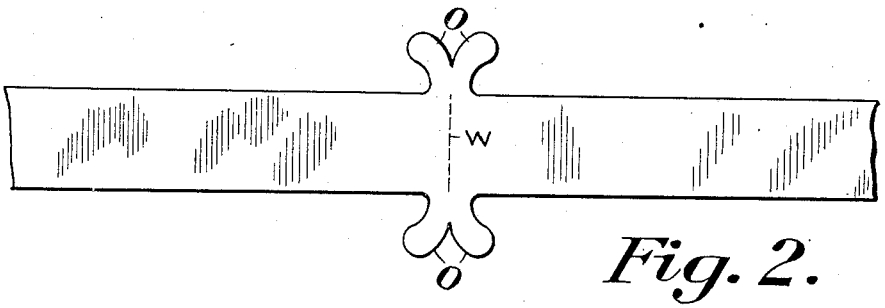
Figure 3:
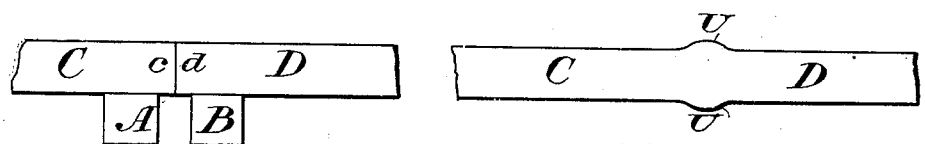
Figure 4:
Figure 5:
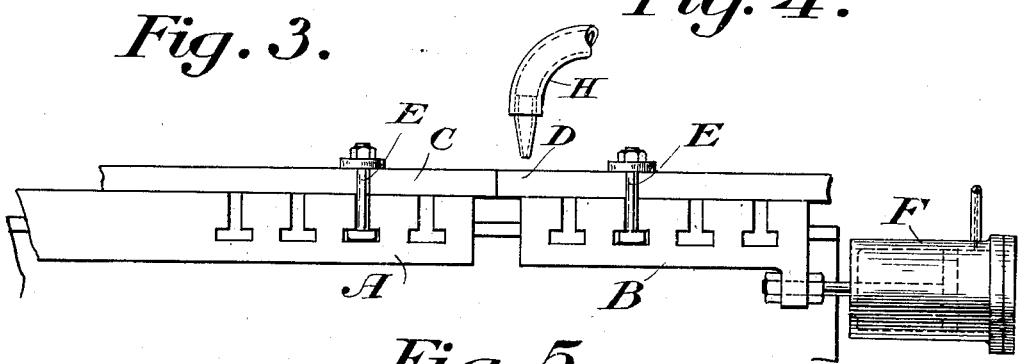

Referring to the drawings, Figure 1 illustrates a side view of a pair of bars and contact-terminals as they may be arranged preparatory to the first step of my improved process. Fig. 2 shows the appearance of the bar after being welded by the specific process which I will describe. Figs. 3 and 4 are views similar, respectively, to Figs. 1 and 2, but illustrative of processes hitherto used. Fig. 5 is a side view of a portion of welding apparatus with the bars in position.

A and B, Fig. 5, represent two tables connected in any suitable manner with the opposite sides of the source of supply for the heating-current. C and D represent two bars to be welded together, and these are clamped to the tables A and B in any suitable manner, such as by the bolts E. Table B is horizontally movable by means of the hydraulic apparatus indicated at F. All this is old in the art, and I have therefore not illustrated it in detail and need not refer to the construction further.

In Figs. 1 and 3 I have illustrated tables A and B simply as blocks engaging the lower surfaces of the bars.

Referring to Figs. 3 and 4, which represent in a diagrammatic manner the old method of welding, it will be noticed that the contact-terminals A and B are a comparatively-short distance apart, and the welded bar of Fig. 4 has been so heated and so upset that there is simply a slight bulge caused by the upset. The portions *c* and *d* of these bars which are between the contact-terminals A and B have been heated almost to the fusing-point and have been upset a very small amount.

Referring now to Figs. 1 and 2, it will be seen that I prefer to place the contact-terminals considerably farther apart than before. This is done so that I may have a central portion, which is here shown as that part between the lines X X and Y Y, heated to a higher temperature than the portions between the line X X and the terminal A and between the line Y Y and the terminal B. These latter portions I may keep cool by a stream of water or other suitable means. In Fig. 5 I have indicated a nozzle H, connected to a suitable source of supply to provide this stream of water. This nozzle can be moved from one side of the heated zone to the other and the stream of water directed as desired. Any other suitable means may, however, be provided for supplying the water, or the desired effect may be accomplished in any effective manner, my invention not being limited in this respect. When the central portion has reached the desired temperature, I prefer to upset with sufficient pressure and through a sufficient distance to remove substantially all of the metal in the heated zone extending from X X to Y Y, so that the real weld between the two metals, represented by dotted line W, is formed by the metal which has been kept cool by the stream of water playing on it. The original exposed surfaces of the bars (represented by o) are entirely outside of the regular section of the bar and may be cut off in any suitable manner.

The particular object of using water in the specific construction which I have described is that to remove entirely the original surfaces o of the bars it is necessary to have a sharp contrast between the metal of the central portion of the bars and that of the portions back of the lines X X and Y Y, or, in other words, to concentrate the heat at the central portion of the two bars; otherwise the upset would not take the shape shown in Fig. 2, but would merely exaggerate the shape shown in Fig. 4, so that the removal of the original surfaces would only be partial. A partial removal of the original surfaces would not attain my object, because so long as any portion of the original surfaces are in the regular section of the bar not only will a portion of the regular section of the bar be formed of non-united original surfaces, but a further portion of the bar will be prevented from uniting, because this lack of union causes neighboring portions to be exposed to the air.

Of course the particular temperature which may be used is immaterial, as my invention broadly consists in removing the entire original surfaces of the bars and forming the union between parts of the two bars which have never been exposed to the atmosphere. The specific steps which I have set forth are also immaterial to my broad invention, although themselves constituting my specific invention.

I have found that my invention is particularly adapted to the welding of steel, the malleability and strength of which is so easily destroyed by high heat, and I have found that steel bars welded to each other at very low temperatures by my improved method are integrally united and when broken present a fracture which is perfectly clean and is small-grained in appearance.

Having thus described my invention, what I claim, and desire to protect by Letters Patent, is—

1. The method of electric welding which consists in passing the heating-current through contacting surfaces of the two articles to be united concentrating the heat at portions of said articles adjacent to said contacting surfaces between the points where the union is to be made and making the actual union between unexposed portions of the articles.

2. The method of electric welding consisting in passing the heating-current through contacting surfaces of the two articles to be united, concentrating the heat at portions of said articles between the points where the actual union is to be made removing said contacting surfaces from the regular cross-section of the articles and making the actual union between unexposed portions of the articles.

3. The method of electric welding which consists in heating a short end of each of the two articles to be united, maintaining a comparatively-low temperature beyond said short end, and upsetting the ends sufficiently so that the actual union is between that metal maintained at a comparatively-low temperature.

4. The method of electric welding which consists in passing the heating-current through a suitable length of the articles to be united, artificially cooling portions of the metal through which the current is passing, and upsetting the articles sufficiently to bring the cooled portions in contact.

5. The method of electric welding which consists in concentrating the heat zone close to the ends of the articles to be united and then upsetting sufficiently to remove the metal in said heat zone so as to make the actual union between the articles with metal outside said heat zone.

6. The herein-described method of electric welding, which consists in passing the heating-current through contacting portions of the two articles to be united, concentrating the heating effect of the current between the points where the final union is to be made, and then removing the portions at which the heat is concentrated, and making the final union between portions which are at a comparatively-low temperature and which have been protected from exposure to the atmosphere by the removed portions.

In testimony whereof I have affixed my signature in presence of two witnesses.

RICHARD EYRE.

Witnesses:
MYRTLE E. SHARPE,
ROBERT M. EVANS.